(12) United States Patent
Uno (10) Patent No.: US 10,724,129 B2
(45) Date of Patent: Jul. 28, 2020

(54) PRECIPITATION HARDENED HIGH NI HEAT-RESISTANT ALLOY

(71) Applicant: DAIDO STEEL CO., LTD., Nagoya (JP)

(72) Inventor: Koichi Uno, Shibukawa (JP)

(73) Assignee: DAIDO STEEL CO., LTD., Nagoya-Shi, Aichi (JP)

(*) Notice: Subject to any disclaimer, the term of this patent is extended or adjusted under 35 U.S.C. 154(b) by 57 days.

(21) Appl. No.: 15/791,476

(22) Filed: Oct. 24, 2017

(65) Prior Publication Data
US 2018/0112299 A1 Apr. 26, 2018

(30) Foreign Application Priority Data

Oct. 24, 2016 (JP) ................. 2016-207947
Dec. 14, 2016 (JP) ................. 2016-242221
Aug. 30, 2017 (JP) ................. 2017-166063

(51) Int. Cl.
*C22C 19/05* (2006.01)
*C22F 1/10* (2006.01)
*B22D 7/00* (2006.01)
*C22C 1/02* (2006.01)

(52) U.S. Cl.
CPC ............ *C22F 1/10* (2013.01); *B22D 7/005* (2013.01); *C22C 1/023* (2013.01); *C22C 19/055* (2013.01); *C22C 19/056* (2013.01); *C22C 19/057* (2013.01)

(58) Field of Classification Search
CPC ....... C22F 1/10; C22C 19/056; C22C 19/055; C22C 1/023; C22C 19/05
See application file for complete search history.

(56) References Cited

U.S. PATENT DOCUMENTS

| 4,652,315 | A | * | 3/1987 | Igarashi | .................. C22C 30/00 |
| | | | | | 148/410 |
| 4,765,956 | A | * | 8/1988 | Smith | ..................... C22C 19/05 |
| | | | | | 420/445 |
| 8,293,169 | B2 | | 10/2012 | Semba et al. | |
| 9,238,857 | B2 | | 1/2016 | Kiuchi et al. | |
| 2009/0123290 | A1 | | 5/2009 | Imano et al. | |
| 2011/0223055 | A1 | | 9/2011 | Semba et al. | |
| 2015/0159241 | A1 | * | 6/2015 | Hamaguchi | ............ C22C 30/00 |
| | | | | | 420/443 |
| 2016/0289807 | A1 | | 10/2016 | Hattendorf | |
| 2016/0319402 | A1 | | 11/2016 | Hattendorf | |

FOREIGN PATENT DOCUMENTS

| CN | 102171373 B | 6/2013 |
| DE | 10 2014 001 328 A1 | 8/2015 |
| DE | 10 2014 001 330 A1 | 8/2015 |
| EP | 2 993 243 A1 | 3/2016 |
| JP | 2009-167499 A | 7/2009 |
| JP | 2009-167500 A | 7/2009 |

OTHER PUBLICATIONS

Taiwanese Office Action, dated Aug. 16, 2018, in Taiwanese Application No. 106136522 and English Translation thereof.
Extended European Search Report dated Feb. 13, 2018 in European Application No. 17197969.3.
Korean Office Action, dated Feb. 18, 2019, in Korean Application No. 10-2017-0137539 and English Translation thereof.
Xishan Xie, et al. "The Effect of Nb, Ti, Al on precipitation and strengthening behavior of 718 type superalloys" TMS (The Minerals, Metals & Minerals Society), pp. 287-298 (2005).

* cited by examiner

*Primary Examiner* — Jessee R Roe
(74) *Attorney, Agent, or Firm* — McGinn I.P. Law Group, PLLC.

(57) ABSTRACT

The present invention relates to a precipitation hardened high Ni heat-resistant alloy having a component composition including, in terms of mass %: Cr: 14 to 25%; Mo: 15% or less; Co: 15% or less; Cu: 5% or less; Al: 4% or less; Ti: 4% or less; Nb: 6% or less; provided that Al+Ti+Nb is 1.0% or more; and inevitable impurities including at least C and N, with the balance being Ni, in which C is contained in an amount of 0.01% or less, and N fixed as carbonitride is contained in such an amount that Michelin point determined from inclusions extracted by an evaluation method according to ASTM-E45 is 100 or less.

12 Claims, 9 Drawing Sheets

Fig. 1

|  | Alloy | Added element (unit: mass %) | | | | | | | | | |
|---|---|---|---|---|---|---|---|---|---|---|---|
|  |  | Ni | Fe | Cr | Mo | Cu | Co | Al | Ti | Nb | Al+Ti+Nb |
| Example 1 | Alloy 1 | 53.4 | 19 | 18 | 3 | - | - | 0.5 | 0.9 | 5.2 | 6.6 |
|  | Alloy 2 | 65.3 | - | 22 | 9 | - | - | 0.2 | 0.2 | 3.3 | 3.7 |
|  | Alloy 3 | 58.8 | - | 20 | 4 | - | 13 | 1.3 | 2.9 | - | 4.2 |
| Example 2 | Alloy 4 | 44 | 26.9 | 23 | 3 | 2 | - | 0.1 | 1 | - | 1.1 |
| Comparative Example 1 | Alloy 5 | 44 | 51.2 | - | - | - | - | 0.1 | 1.3 | 3.4 | 4.8 |

FEEDING

*Fig. 4B*

MELTING

*Fig. 4C*

CASTING

Fig. 5

| Test No. | Alloy | Content (unit: mass %) | | | Cleanliness | Removal of coating |
|---|---|---|---|---|---|---|
| | | C | N | C+4.5N | | |
| 1 | Alloy 1 | 0.0030 | 0.0030 | 0.0185 | 40 | Removed |
| 2 | | 0.0020 | 0.0081 | 0.0385 | 100 | Removed |
| 3 | | 0.0250 | 0.0087 | 0.0642 | 300 | None |
| 4 | Alloy 2 | 0.0020 | 0.0029 | 0.0151 | 20 | Removed |
| 5 | | 0.0020 | 0.0112 | 0.0524 | 200 | None |
| 6 | | 0.0310 | 0.0103 | 0.0774 | 400 | None |
| 7 | Alloy 3 | 0.0040 | 0.0050 | 0.0265 | 20 | Removed |
| 8 | | 0.0300 | 0.0050 | 0.0525 | 50 | Removed |
| 9 | | 0.0600 | 0.0050 | 0.0825 | 150 | None |

Fig. 6

| Test No. | Alloy | Content (unit: mass %) | | | Cleanliness | Removal of coating |
|---|---|---|---|---|---|---|
| | | C | N | C+4.5N | | |
| 10 | Alloy 4 | 0.0050 | 0.0030 | 0.0185 | 10 | Removed |
| 11 | | 0.0100 | 0.0040 | 0.0280 | 60 | Removed |
| 12 | | 0.0300 | 0.0070 | 0.0615 | 130 | None |
| 13 | Alloy 5 | 0.0020 | 0.0010 | 0.0065 | 40 | Removed |
| 14 | | 0.0040 | 0.0016 | 0.0112 | 50 | Removed |
| 15 | | 0.0060 | 0.0021 | 0.0155 | 350 | None |
| 16 | | 0.0080 | 0.0024 | 0.0188 | 500 | None |

|  | Chemical component (mass %) | | | | | | | | | |
|---|---|---|---|---|---|---|---|---|---|---|
|  | Ni | Cr | Mo | Cu | Co | W | Al | Ti | Nb | Fe |
| Alloy A | 53 | 18 | 3 | - | - | - | 0.5 | 1.0 | 5.2 | Bal. |
| Alloy B | Bal. | 22 | 9 | - | - | - | 0.3 | 0.3 | 3.3 | - |
| Alloy C | Bal. | 16 | - | - | - | - | 0.3 | 0.3 | - | 9 |
| Alloy D | 61 | 23 | - | - | - | - | 1.4 | 0.3 | - | Bal. |
| Alloy E | Bal. | 16 | - | - | - | - | 0.8 | 2.5 | 0.9 | 7 |
| Alloy F | Bal. | 16 | - | - | - | - | 1.2 | 2.4 | 0.9 | 8 |
| Alloy G | 31 | 20 | - | - | - | - | 0.4 | 0.4 | - | Bal. |
| Alloy H | 32 | 21 | - | - | - | - | 0.5 | 0.5 | - | Bal. |
| Alloy J | 44 | 23 | 3 | - | - | - | 0.1 | 1.0 | - | Bal. |
| Alloy K | 44 | 21 | 3 | 2 | - | - | 0.3 | 2.3 | - | Bal. |
| Alloy L | 64 | - | - | 31 | Bal. | - | 2.9 | 0.5 | - | 0.8 |
| Alloy M | Bal. | 20 | 4 | - | 14 |  | 1.3 | 2.9 | - | - |
| Alloy N | Bal. | 19 | 6 | - | 12 | 1 | 1.9 | 3.0 | - | - |

PRECIPITATION HARDENED HIGH NI HEAT-RESISTANT ALLOY

FIELD OF THE INVENTION

The present invention relates to a precipitation hardened high Ni heat-resistant alloy having high temperature mechanical strength enhanced by dispersing and precipitating at least one of intermetallic compound particles of Al, Ti and Nb in Ni matrix, and particularly relates to a precipitation hardened high Ni heat-resistant alloy having excellent machinability while having high mechanical strength.

BACKGROUND OF THE INVENTION

A precipitation hardened high Ni heat-resistant alloy including Ni matrix having finely precipitated therein an intermetallic compound is known as an alloy material of heat-resistant parts requiring high temperature mechanical strength, such as engine valves of automobiles and turbine wheels for thermal power generation. The high Ni heat-resistant alloy contains, in a component composition thereof, precipitate-forming elements such as Al, Ti and Nb that form an intermetallic compound with Ni, but those elements have strong bonding force to C and are easy to form carbide. For this reason, in the high Ni heat-resistant alloy containing C, excellent high temperature mechanical strength by the intermetallic compounds is obtained, but on the other hand, deterioration of cutting workability (machinability) by the carbide precipitated becomes a problem.

To improve machinability of the high Ni heat-resistant alloy, alloy component composition including carbon and precipitation-forming elements is severely controlled and adjusted using a vacuum melting furnace, a remelting furnace or the like. Furthermore, it is proposed to control an aging heat treatment that controls precipitation state of precipitates.

For example, Patent Document 1 discloses a precipitation hardened Ni-based heat-resistant alloy for hot work die containing Al, Ti and Nb, which is high Ni heat-resistant alloy containing Cr in an amount of about 14 to 25 mass %, in which C content is controlled to 0.03 mass % or less to suppress precipitation of carbide, whereby machinability can be improved. This patent document describes about poor machinability of an alloy having a component composition precipitating intermetallic compounds called "γ' phase" and "γ" phase" in addition to γ phase, among high Ni heat-resistant alloys. The patent document describes that the poor machinability is generally considered to be due to hardness of fine particles including intermetallic compounds as a hardening phase, but the influence by primary carbide precipitated in a solidification process during casting an alloy is great, and also describes that the amount of C is controlled in order to suppress precipitation of the primary carbide.

Similar to Patent Document 1, Patent Document 2 discloses a method for improving machinability of high Ni heat-resistant alloy containing Cr in an amount of about 14 to 25 mass % by dissolving precipitated fine primary carbide in a matrix by a soaking heat treatment. The patent document describes that the soaking heat treatment is, for example, a heat treatment of maintaining an alloy in a relatively high temperature region as compared with a melting point of the alloy, such as 1,100 to 1,300° C., for a long period time of 10 to 40 hours, and by this treatment, Michelin point as an index of cleanliness of an alloy can be reduced to 100 or less.
Patent Document 1: JP-A-2009-167499
Patent Document 2: JP-A-2009-167500

SUMMARY OF THE INVENTION

As described above, an alloy is exposed to relatively high temperature region as compared with a melting point of the alloy for a long period of time in the soaking heat treatment. As a result, depending on an alloy, mechanical strength thereof may be deteriorated. Furthermore, depending on carbide in an alloy, the carbide cannot be sufficiently dissolved in a matrix even by a soaking heat treatment, and there was a case that machinability was not improved.

The present invention has been made in view of the above circumstances, and an object thereof is to provide a precipitation hardened high Ni heat-resistant alloy having high temperature strength enhanced by dispersing and precipitating at least one of intermetallic compound particles of Al, Ti and Nb in Ni matrix, and having high machinability without a soaking heat treatment.

The present inventors have found that, in a precipitation hardened high Ni heat-resistant alloy having a specific component composition and having high temperature strength enhanced by dispersing and precipitating at least one of intermetallic compound particles of Al, Ti and Nb in Ni matrix, nitride greatly affects machinability as compared with carbide. There is a limit to reduction of the amount of carbon as impurities. Despite of this, they have developed a method for manufacturing an alloy, capable of reducing nitride and/or carbonitride (hereinafter simply referred to as "carbonitride"), and have reached to obtain new precipitation hardened high Ni heat-resistant alloy having excellent machinability.

A precipitation hardened high Ni heat-resistant alloy according to the present invention has a component composition including, in terms of mass %:
  Cr: 14 to 25%;
  Mo: 15% or less;
  Co: 15% or less;
  Cu: 5% or less;
  Al: 4% or less;
  Ti: 4% or less;
  Nb: 6% or less;
  provided that Al+Ti+Nb is 1.0% or more; and
  inevitable impurities including at least C and N,
  with the balance being Ni,
  in which C is contained in an amount of 0.01% or less, and N fixed as carbonitride is contained in such an amount that Michelin point determined from inclusions extracted by an evaluation method according to ASTM-E45 is 100 or less.

According to the present invention, it is not intended to dissolve, in a matrix, the carbonitride formed, but the formation of a fine carbonitride itself is suppressed. It is not necessary to pass through a soaking heat treatment at high temperature having a concern of deteriorating mechanical strength by fusion of grain boundary, coarsening of crystal grains, and the like, and high machinability is achieved.

In the present invention described above, the component composition may further includes, in terms of mass %, Fe in an amount of 15 to 30%. According to the present invention, a part of Ni can be replaced with inexpensive Fe. As a result, alloy cost performance is excellent, and high Ni heat-resistant alloy having high machinability is obtained.

In the present invention described above, in the component composition, the Michelin point may be in first-order proportional to (C+4.5N) represented by the amounts of C and N. Furthermore, the amount of N may be 0.0050% or less in terms of mass %. According to the present invention, high machinability can be efficiently obtained by reduction of the amount of N.

In the present invention described above, the component composition may further includes, in terms of mass %, P in an amount of 0.005 to 0.010%. According to the present invention, high temperature mechanical strength, particularly creep resistance, can be enhanced.

DETAILED DESCRIPTION OF THE INVENTION

High Ni heat-resistant alloy as one example of the present invention is described below by reference to FIGS. 1 to 11.

The high Ni heat-resistant according to the present invention is a precipitation hardened heat-resistant alloy including γ phase as a matrix of Ni having dispersed and precipitated therein fine intermetallic compound called γ' phase or γ" phase, and specifically a precipitation hardened high Ni heat-resistant alloy containing precipitate-forming elements such as Al, Ti and Nb.

Figure 1:
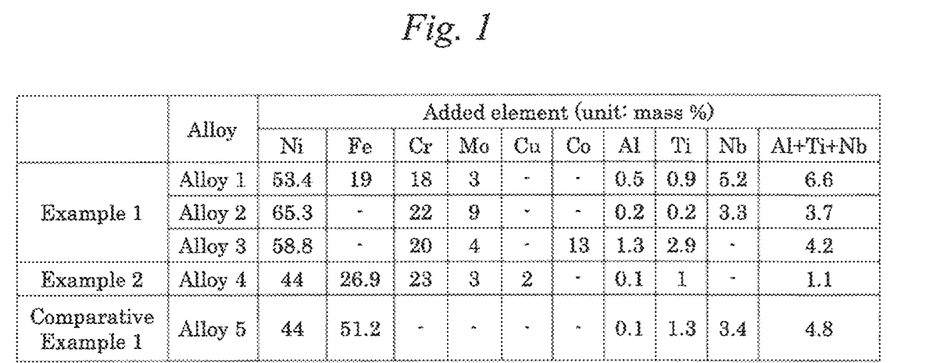
FIG. 1 is a table showing examples of component compositions of high Ni heat-resistant alloy according to the present invention.

More specifically, as shown in FIG. 1, the high Ni heat-resistant alloy is an alloy including Ni as a major component and at least one of Al, Ti and Nb precipitating intermetallic compounds with Ni, as an essential component, and further including Fe, Cr, Mo, Cu, Co and the like in predetermined amounts. The term "high Ni heat-resistant alloy" used herein means not only an alloy including 50 mass % or more of Ni (see Example 1 in FIG. 1), but also an alloy including about 30 mass % or more and less than 50 mass % of Ni (see Example 2 in Table 1).

As shown in alloys 1 to 4 in FIG. 1, the high Ni heat-resistant alloys of Examples 1 and 2 have a component composition including, in terms of mass %:

Cr: 14 to 25%;
Mo: 15% or less;
Co: 15% or less;
Cu: 5% or less;
Al: 4% or less;
Ti: 4% or less; and
Nb: 6% or less;
provided that Al+Ti+Nb is 1.0% or more;
with the balance being Ni.

The alloys further include inevitable impurities including at least C and N, in which an amount of C which is the inevitable impurity is 0.01 mass % or less, and an amount of N fixed as carbonitride is such an amount that Michelin point described hereinafter is 100 or less. As a result, at least one of intermetallic compound particles of Al, Ti and Nb is dispersed and precipitated in Ni matrix, thereby enhancing high temperature mechanical strength. In this case, the alloy may further include Fe in an amount of 15 to 30 mass %, as shown in alloys 1 and 4 in FIG. 1.

The reason for limiting a component range of each element added in the high Ni heat-resistant alloy is briefly described below.

Al and Ti form γ' phase that is an intermetallic compound with Ni, and are finely dispersed and precipitated in a matrix phase γ to enhance high temperature strength. Furthermore, Nb also forms γ" phase that is an intermetallic compound with Ni, and is finely dispersed and precipitated in a matrix phase γ to enhance high temperature strength. On the other hand, Al, Ti and Nb have high productivity of carbide and nitride. Particularly, very fine carbonitride formed after smelting does not greatly affect high temperature strength, but rapidly wears a tool blade during cutting, leading to deterioration of machinability. Considering those, the amounts of Al and Ti are 4 mass % or less, respectively, the amount of Nb is 6 mass % or less, and in addition to this, the amount of Al+Ti+Nb is limited to 1.0 mass % or more.

Cr enhances oxidation resistance, corrosion resistance and high temperature strength. On the other hand, excessive content of Cr relatively decreases the content of Ni in an alloy, thereby deteriorating high temperature strength. Considering those, the amount of Cr added is a range of 14 to 25 mass %.

Mo is dissolved in a matrix to harden the matrix. Considering this, the amount of Mo added is 15 mass % or less, and preferably a range of 0.1 to 10 mass %.

Cu increases corrosion resistance against chloride ions. However, excessive content thereof affects high temperature strength. Considering those, when Cu is added, the amount of Cu added is 5 mass % or less.

Co is dissolved in a matrix to harden the matrix. Furthermore, Co increases precipitation amount of intermetallic compounds between Ni and (Al, Ti and Nb), and as a result, high temperature strength of an alloy is enhanced. Considering those, when Co is added, the amount Co added is 15 mass % or less.

Fe substitutes Ni of γ' phase. As a result, the amount of Ni is reduced, and the cost of an alloy can be decreased. On the other hand, when Fe is excessively contained, desired high temperature strength is not achieved with decreased amount of Ni. Considering those, when Fe is added, the amount of Fe added is 15 to 30 mass %.

One example of a manufacturing process of the high Ni heat-resistant alloy is described by reference to FIGS. 2, 3, and 4A to 4C.

Figure 2:
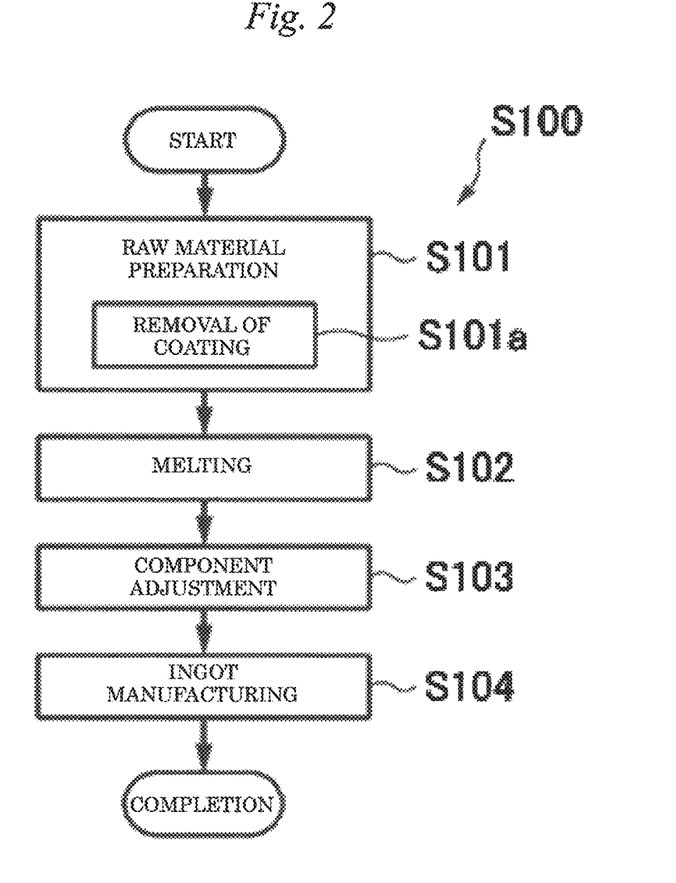
FIG. 2 is a flow chart showing steps of a method for manufacturing high Ni heat-resistant alloy according to the present invention.

A smelting process S100 performs smelting of various high Ni heat-resistant alloys having component compositions shown in FIG. 1 while controlling the upper limit of the content of inevitable impurities (C and N in the present invention). The smelting process S100 generally performs smelting by combining wastes (scrap raw materials) having component compositions close to the component compositions as shown in FIG. 1 with alloys for component adjustment. The term "wastes" used herein mean, for example, waste materials of products that reached the life distributed in a scrap market and waste materials having controlled component compositions generated in a company when alloy materials or products have been newly manufactured. Of those wastes, the latter waste materials are called "returned materials", and the returned materials are preferred in controlling components including inevitable impurities.

A waste and a raw material alloy such as Fe—Nb or Fe—Cr,Ni are prepared (raw material preparation step: S101). In this case, the step prepares an alloy containing low C and N contents as the raw material alloy, and further includes a removal step of removing a coating on the surface of the waste (coating removal step: S101a). As described above, in order to manufacture various high Ni heat-resistant alloys having the component compositions as shown in FIG. 1, alloys having a component composition close to those component compositions have a compound coating containing carbide, nitride or carbonitride together with an oxide coating on the surface thereof. Particularly, nitride or carbonitride is liable to be contained by containing precipitation forming elements of Al, Ti and Nb, and the amount of N is liable to be increased as the whole alloy. When those coatings are removed from the surface of the waste, impurities becoming the sources of carbon C and nitrogen N can be removed before melting in a melting furnace in the subsequent melting step S102, and as a result, the contents of C and N in the high Ni heat-resistant alloy finally manufactured can be reduced.

Figure 3:
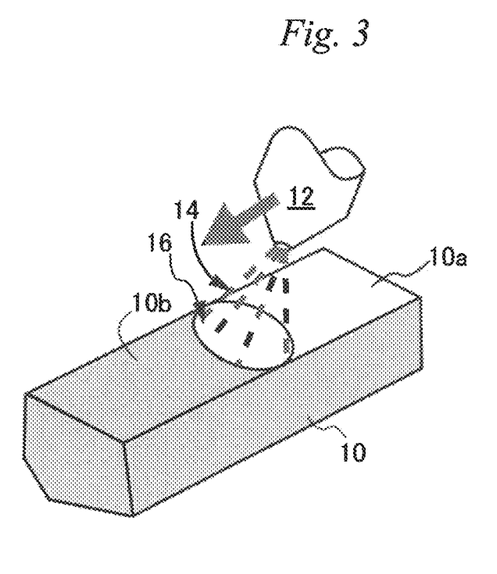
FIG. 3 is a perspective view showing shot blasting.

Example of the coating removal step S101a includes "shot blasting" as shown in FIG. 3. The shot blasting is that a blast flow 14 containing hard fine particles is injected to the surface of the waste 10 from an injection mechanism 12 such as a nozzle, and the fine particles collide with an injection face 16 on the surface to mechanically remove a compound coating 10b on the surface. A surface after removal 10a is continuously formed by moving the injection mechanism 12 along the waste 10. In recent years, high Ni heat-resistant alloy is used in a member having a complicated shape, such as a drill for oil drilling. Even in the waste 10 having such a complicated shape, workability is excellent in shot blasting that is not required to manufacture a jig so as to apply to its shape. Optional technology that removes a compound coating from the surface of a waste can also be applied.

Subsequently, the waste 10 having the surface subjected to removal processing and a raw material alloy controlled to low C and low N are heated to a predetermined temperature to melt those in a vacuum melting furnace (melting step: S102). Components of alloys are adjusted by, for example, feeding additional additive elements, as necessary (component adjustment step: S103). Thereafter, a melt having controlled components is cast in a mold having a predetermined shape, thereby casting ingots having various shapes (ingot manufacturing step: S104).

Figure 4A:
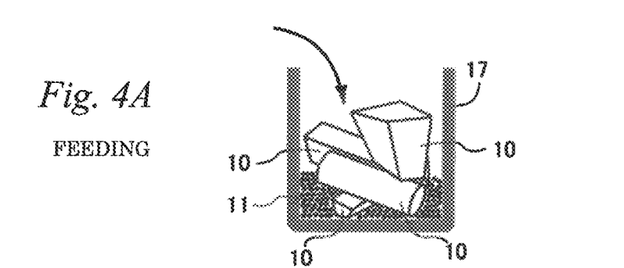
FIGS. 4A to 4C are schematic views showing one example of a smelting process.
Figure 4B:
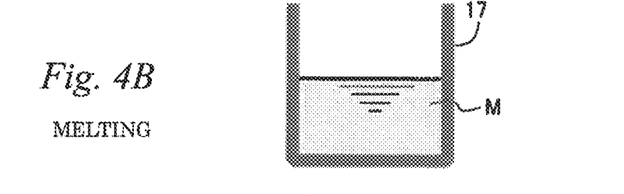
Figure 4C:
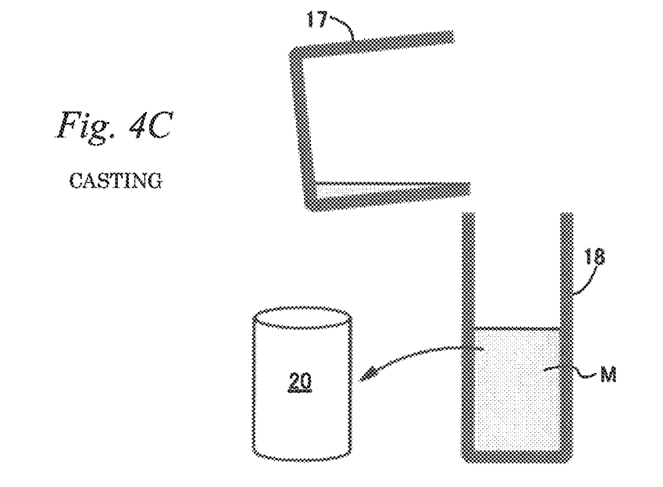

In detail, as shown in FIGS. 4A to 4C, the waste 10 from which a compound coating on the surface thereof has been removed in the coating removal step S101a and the raw material alloy 11 are fed together to a melting chamber 17 of the vacuum melting furnace (FIG. 4A), and heated to a predetermined temperature to melt those (FIG. 4B). Thereafter, a melt M having controlled components is cast in a mold 18, and an ingot 20 having various shapes is cast (FIG. 4C).

A soaking heat treatment can further be appropriately performed so as to further suppress carbide and nitride from remaining in the ingot so long as thermal damage is allowed. In case where C amount is an extremely low amount of 0.01 mass % or less, the amount of carbide precipitated in an alloy bulk after smelting is very slight. Therefore, it is desirable to apply a soaking heat treatment step to only a case where the C amount is more than 0.01 mass %.

The ingot passes through forging, cutting and the like, and is appropriately further processed after secondary melting. Thus, a final product is formed. In the high Ni heat-resistant alloy manufactured by the manufacturing process, a coating removal step that removes the surface of the waste in a smelting stage of a raw material has been performed, thereby precipitation of carbide and nitride in the ingot is suppressed. As a result, machinability of the high Ni heat-resistant alloy can be enhanced.

As the manufacturing process of the high Ni heat-resistant alloy, the following features may be mentioned.

The manufacturing process is a method for manufacturing a precipitation hardened Ni-based heat-resistant alloy, including at least a smelting step, the smelting step including: a preparation step of preparing a raw material containing a waste including a Ni-based alloy; a melting step of melting the raw material in a furnace to obtain a molten alloy; and a component adjustment step of adjusting alloy components of the molten alloy in the furnace, in which the preparation step includes a removal step of removing the surface of the waste.

The waste may be a Ni-based alloy containing at least one of Al, Ti and Nb, in which the total of those is more than 1 mass %.

The removal step may be a step of removing a compound coating containing nitride and/or carbonitride on the surface of the waste.

The removal step may be a step of performing shot blasting on the surface of the waste.

The manufacturing method may further include a soaking heat treatment step of melting compound particles formed, after the smelting step.

The precipitation hardened Ni-based heat resistant alloy may have a component composition in which the amount of N is larger than the amount of C in terms of mass equivalent of carbide and/nitride formed.

Specific example of manufacturing high Ni heat-resistant alloy by the above-described manufacturing process of high Ni heat-resistant alloy is specifically described below.

Returned material of high Ni heat-resistant alloy was used as a raw material. The component composition that is a target of a final alloy is component compositions of the alloys 1 to 5 in FIG. 1. The alloy 5 is an alloy containing Ni in an amount of about 44 mass % similar to the alloy 4, but is an alloy that does not contain Cr, and was therefore used as a comparative example.

Returned material and a raw material alloy controlled to low C and low N as raw materials were fed to a vacuum induction melting furnace, heated and melted. An alloy for adjusting so as to be chemical component ranges of the alloys 1 to 5 were fed to the melting furnace to adjust the components, and resulting melt was cast in a mold to prepare an ingot. The ingot was subjected to hot forging at a temperature of about 1,100° C. to form a round bar, and then subjected to a heat treatment at a temperature of 1,050° C. for 30 minutes to manufacture a billet.

Figure 5:
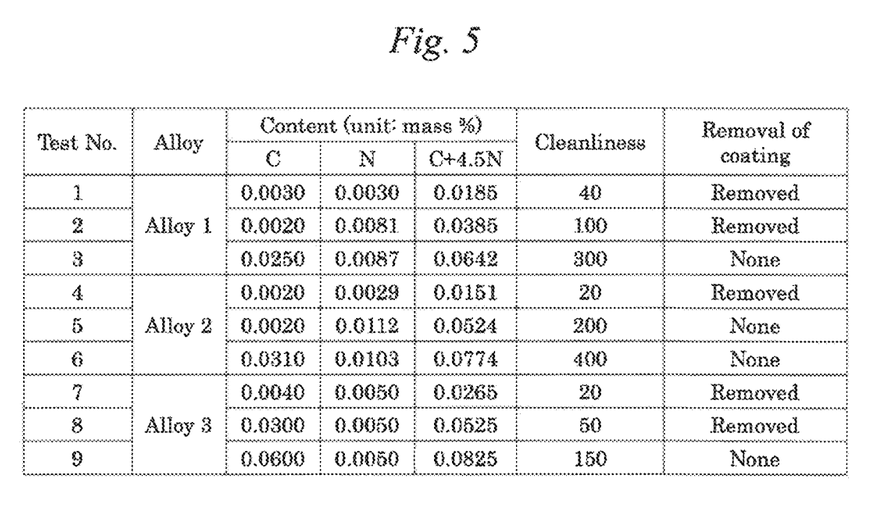
FIG. 5 is a table showing contents of C and N and measurement results of cleanliness of high Ni heat-resistant alloys (Example 1).
Figure 6:
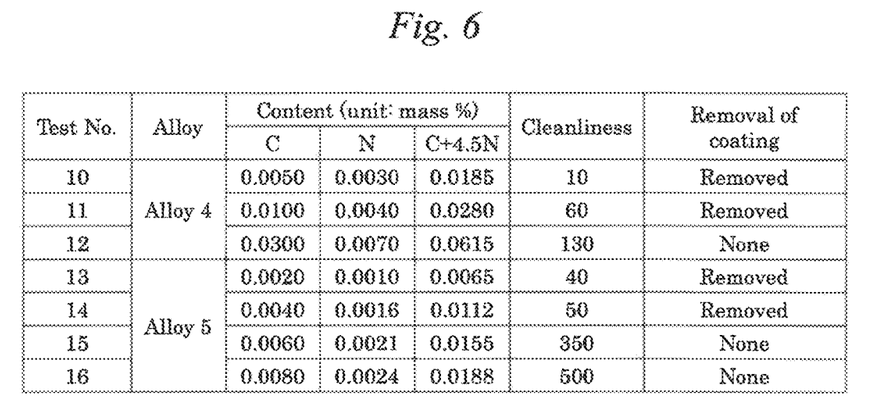
FIG. 6 is a table showing contents of C and N and measurement results of cleanliness of high Ni heat-resistant alloys (Example 2 and Comparative Example 1).
Figure 7A:
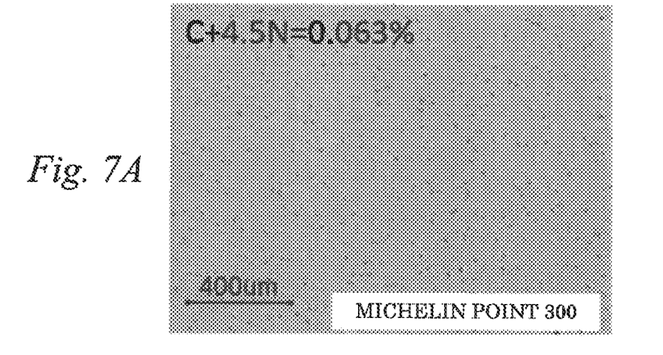
FIGS. 7A to 7C are photographs showing a cross-section of alloys 1 having different total content of C and N.
Figure 7B:
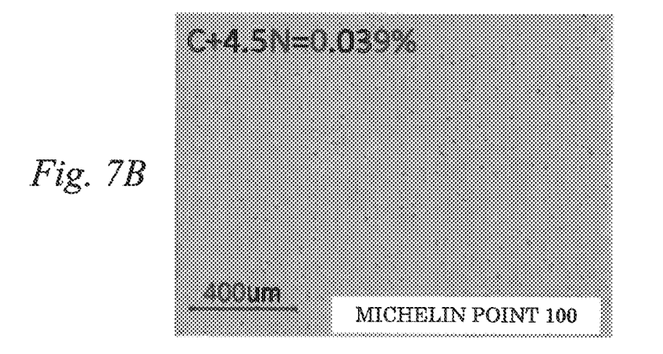
Figure 7C:
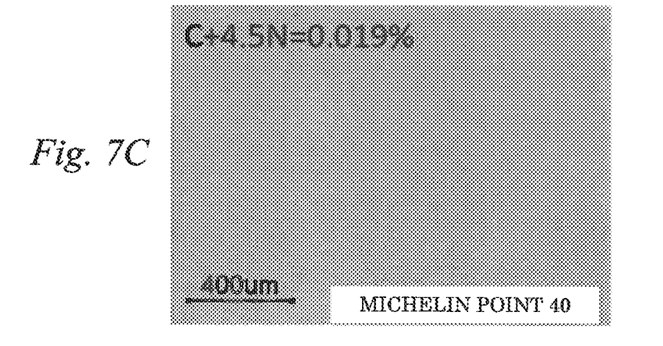

A test piece was cut out from the billet, and contents of carbon C and nitrogen N therein were measured, and additionally, "cleanliness" based on Michelin point was measured as an index of its machinability. The results obtained are shown in FIGS. 5 and 6, and regarding the alloy 1, cross-sectional photographs of an alloy for measuring Michelin point are shown in FIGS. 7A to 7C. As shown in FIGS. 5 and 6, the surface of each returned material collected as a raw material was subjected to a coating removal step by shot blasting before melting in Test Nos. 1, 2, 4, 7, 8, 10, 11, 13 and 14. In the shot blasting, steel particles having an average particle diameter of 0.8 mm and a hardness of HRC 40 to 50 were sprayed to the surface of the returned material.

The term "cleanliness" used herein is defined by "Michelin point" showing the degree of nonmetallic inclusions such as carbide and nitride contained in metallographic structure. The term "Michelin point" used herein is an index for evaluating inclusions by "Michelin method" according to ASTM-E45. Cross-sectional structure having an area to be inspected of 60.5 mm$^2$ is observed with magnification of 400 times, and a size of nonmetallic inclusions having an aspect ratio of 2 or less and a width of 5 μm or more dispersed in the structure is measured. In the inclusions measured, the number of the inclusions having a size (length) of 5 μm or more and less than 10 μm is multiplied by a coefficient 1, the number of the inclusions having a size of 10 μm or more and less than 20 μm is multiplied by a coefficient 5, and the number of the inclusions having a size of 20 μm or more is multiplied by a coefficient 10. The total of those values obtained is defined as Michelin point value. Therefore, the number of inclusions in an observation field is small as the Michelin point number is small, and it is evaluated that cleanliness is high. On the other hand, the number of inclusions in an observation field is large as the Michelin point number is large, and it is evaluated that cleanliness is low.

Example 1

As shown in FIG. 5, regarding alloys containing Ni in an amount of 50 mass % or more, in three test pieces of the alloy 1, the content of carbon C was 0.0030 to 0.0250 mass %, the content of nitrogen N was 0.0030 to 0.0087 mass %, and the cleanliness in this case was 40 to 300. Similarly, in three test pieces of the alloy 2, the content of carbon C was 0.0020 to 0.0310 mass %, the content of nitrogen N was 0.0029 to 0.0112 mass %, and the cleanliness was 20 to 400. Furthermore, in three test pieces of the alloy 3, the content of carbon C was 0.0040 to 0.0600 mass %, the content of nitrogen N was 0.0050 mass %, and the cleanliness was 20 to 150.

Example 2

As shown in FIG. 6, regarding alloys containing Ni in an amount of approximately 30 mass % or more and less than 50 mass %, in three test pieces of the alloy 4, the content of carbon C was 0.0050 to 0.0300 mass %, the content of nitrogen N was 0.0030 to 0.0070 mass %, and the cleanliness in this case was 10 to 130.

Comparative Example 1

Furthermore, regarding alloys containing Ni in an amount of approximately 30 mass % or more and less than 50 mass % but not containing Cr, in four test pieces of the alloy 5, the content of carbon C was 0.0020 to 0.0080 mass %, the content of nitrogen N was 0.0010 to 0.0024 mass %, and the cleanliness was 50 to 500.

As shown in FIGS. 5 and 6, it has been understood that by removing a compound coating formed on the surface of wastes in a smelting step, the high Ni heat-resistant alloys according to the examples can achieve C: 0.01 mass % or less and N: 0.0050 mass % or less, and additionally regarding N fixed as carbonitride, Michelin point determined from inclusions extracted by an evaluation method according to ASTM-E45 can be suppressed to 100 or less. Furthermore, it has been found in the data shown in FIGS. 5 and 6 that when the content of C and N is compared with cleanliness based on Michelin point value, the total value X totaled in a ratio of C:N=1:4.5 (X=C+4.5N) is almost in proportion to the cleanliness.

Figure 8:
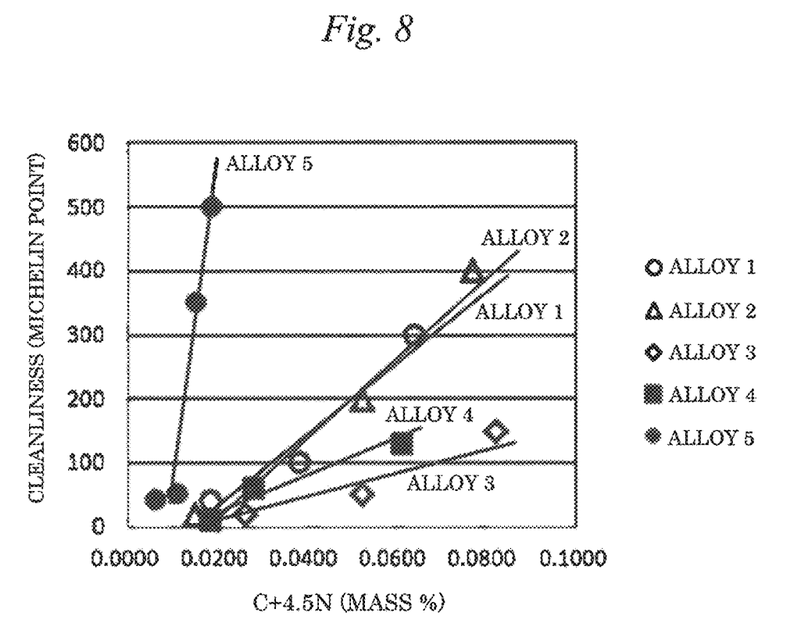
FIG. 8 is a graph showing the relationship between total content of C and N and cleanliness in high Ni heat-resistant alloy according to the present invention.

Specifically, as shown in FIG. 8, when (C+4.5N) value represented by the contents of carbon C and nitrogen N of high Ni heat-resistant alloy is a horizontal axis and the cleanliness based on Michelin point is a vertical axis, it is understood from such a graph that all of alloys 1 to 5 has the relationship that the total content of (C+4.5N) is almost in direct proportion to the Michelin point value. This makes it possible to predict Michelin point value of the high Ni heat-resistant alloy by controlling the total content of (C+4.5N) of carbon C and nitrogen N contained in high Ni heat-resistant alloy to be manufactured. However, in the alloy 5, variation of the Michelin point value to variation of (C+4.5N) value is large, and in the prediction of the Michelin point value, its precision is low as compared with the alloys 1 to 4.

High cleanliness (that is, small Michelin point value) of high Ni heat-resistant alloy means that the amount of inclusions contained in the structure is small. Thus, the high Ni heat-resistant alloy having high cleanliness showed high machinability. Therefore, when a compound coating such as carbide or nitride is removed in a smelting step and additionally the composition range is as above and X value is suppressed, high Ni heat-resistant alloy having both enhanced high temperature strength and machinability can be obtained.

For example, when X value is determined such that the cleanliness (Michelin point value) shown in FIG. 8 is 100 or less in the alloys 1 to 4, excellent machinability is achieved in high Ni heat-resistant alloy produced.

Example 3

Figure 9:
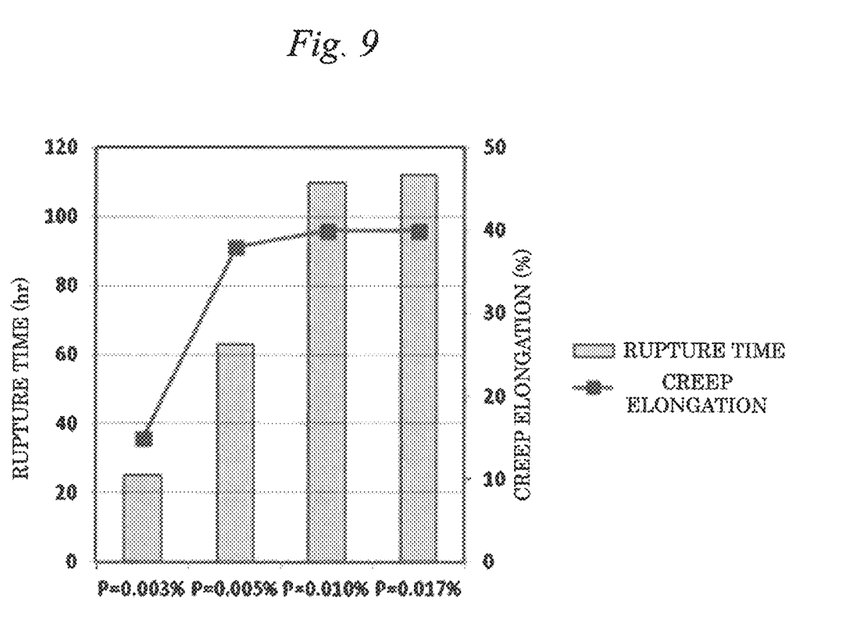
FIG. 9 is a graph showing the relationship between a content of P and creep property.

FIG. 9 shows the results of a creep test using test pieces having various P contents of 0.003 mass %, 0.005 mass %, 0.010 mass % and 0.017 mass % in the alloy 1. In the creep test, the temperature was 649° C., and the load was 689 MPa in terms of stress.

As shown in FIG. 9, there was a tendency that rupture time and elongation as creep properties are improved with increasing P content. Furthermore, in the test piece in which the P content was changed in the alloy 4, the creep properties were similarly improved by containing a slight amount of P. Specifically, in the high Ni heat-resistant alloy described above, from the standpoint of high temperature creep property, it is preferred to contain P in an amount that does not impair hot workability and manufacturability, and the content thereof is in a range of 0.005 to 0.010 mass %.

Turning Test

Figure 10A:
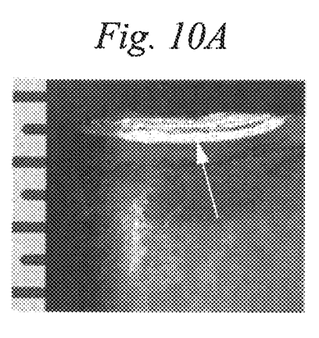
FIGS. 10A and 10B are photographs of tool tip after a turning test.
Figure 10B:
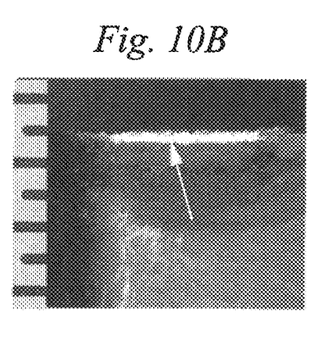

FIGS. 10A and 10B show photographs of a tool tip when a turning test was performed using a carbide tool in a billet of the alloy 2. The photographs show the tip of the carbide tool after 11 minutes from the start of the turning test. The conditions of the turning test were machining rate: 50 m/min, feed rate: 0.4 mm/rev and cutting depth: 2.0 mm.

As shown in FIG. 10A, in the billet manufactured by the conventional manufacturing method in which an ingot was directly forged without subjecting a waste material contained in a raw material to shot blasting, the tip of the tool was greatly worn as shown by a white arrow in the photograph.

On the other hand, as shown in FIG. 10B, in the billet manufactured by the above manufacturing process removing the compound coating of a waste, it can be confirmed that wear of the carbide tool is greatly reduced as shown by a white arrow in the photograph. In other words, the result was obtained that the high Ni heat-resistant alloys manufactured by the manufacturing process in Examples are excellent in machinability to the same carbide tool.

Figure 11:
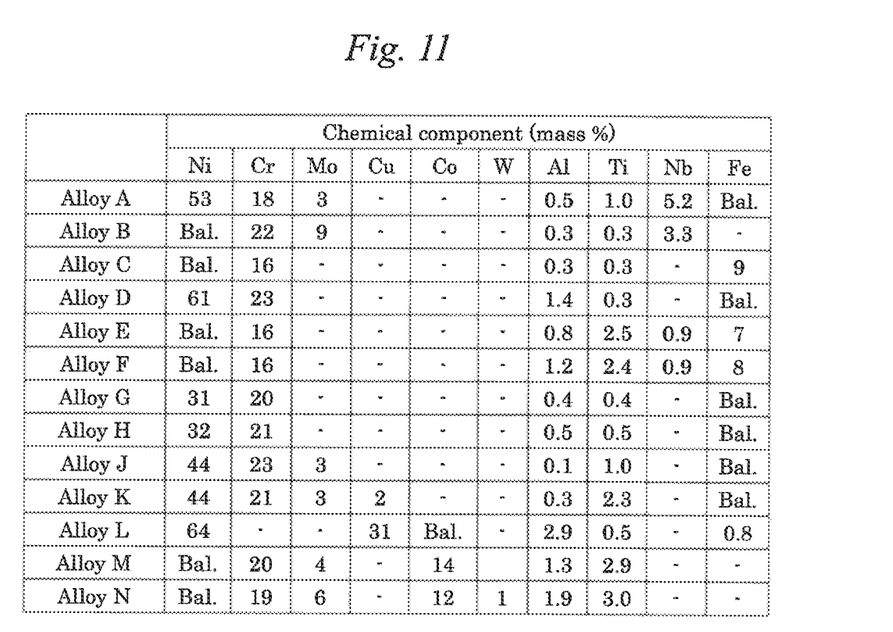
FIG. 11 is a table showing component compositions of alloys to which the manufacturing process of the present invention can be applied.

FIG. 11 is a table showing alloys A to N as examples of the high Ni heat-resistant alloys to which the above manufacturing process can be applied, and chemical components that are considered to be the respective final targets. It was confirmed in the same turning test as above that good machinability was obtained even in those alloys. In the alloy containing Ni in an amount of approximately 30 mass % or more, the same machinability improvement effect as in the manufacturing process is obtained. Therefore, the high Ni heat-resistant alloy intended herein includes an alloy containing Ni in an amount of approximately 30 mass % or more.

In the conventional manufacturing method described above, it was difficult to achieve that N content in an ingot obtained is 100 ppm or less even though the treatment time of a degassing treatment of a vacuum induction melting furnace is prolonged. On the other hand, the N content in the ingot obtained by the above manufacturing process is 60 ppm or less, and the similar N content was maintained in the billet. It was also understood that when chemical components of the high Ni heat-resistant alloy and heat treatment conditions are appropriately selected, the N content can be reduced to 50 ppm or less, and preferably 40 ppm or less, wear of a carbide tool can be further reduced, and machinability can be enhanced.

The machinability was conventionally improved by reducing C amount. On the other hand, it was confirmed that N amount greatly affect machinability, as shown in the turning test described above. It was further confirmed that when the amount of carbide and nitride affecting machinability is obtained by microscopic observation, there is a tendency that the amount of carbide and nitride can be greatly reduced when a predetermined amount of N was reduced, rather than when the same amount of C was reduced. This tendency was the same in all of the above precipitation hardened high Ni heat-resistance alloys. In other words, in the high Ni heat-resistant alloy having a component composition in which N is larger than C in terms of mass equivalent of carbide and/or nitride formed, machinability can be effectively enhanced by applying the above manufacturing process.

The representative examples of the present invention are described above. However, the present invention is not always limited to those examples, and one skilled in the art can find various substitute examples and modification examples without departing from the gist of the present invention.

The present application is based on Japanese patent application No. 2016-207947 filed on Oct. 24, 2016, Japanese patent application No. 2016-242221 filed on Dec. 14, 2016 and Japanese patent application No. 2017-166063 filed on Aug. 30, 2017, and the contents of which are incorporated herein by reference.

DESCRIPTION OF REFERENCE NUMERALS AND SIGNS

10: Waste
10b: Compound coating
12: Injection mechanism
14: Blast flow
16: Injection face

What is claimed is:

1. A precipitation hardened Ni heat-resistant alloy having a component composition consisting of, in terms of mass %:
   Cr: 14% to 25%;
   Mo: 15% or less;
   Co: 15% or less;
   Cu: 5% or less;
   Al: 4% or less;
   Ti: 0.9% to 4%;
   Nb: 6% or less,
      provided that Al+Ti+Nb is 1.0% or more; and
   inevitable impurities including at least C and N,
   with a balance being Ni,
   wherein C is contained in an amount of 0.01% or less, and
   wherein N, fixed as carbonitride, is contained in such an amount that a Michelin point determined from inclusions extracted by an evaluation method according to ASTM-E45 is 100 or less.

2. The precipitation hardened Ni heat-resistant alloy according to claim 1, wherein an amount of N is 0.0050% or less in terms of mass %.

3. The precipitation hardened Ni heat-resistant alloy according to claim 1, wherein, in the component composition, the Michelin point is in a first-order proportion to (C+4.5N) represented by amounts of C and N.

4. A precipitation hardened Ni heat-resistant alloy having a component composition consisting of, in terms of mass %:
   Cr: 14% to 25%;
   Mo: 15% or less;
   Co: 15% or less;
   Cu: 5% or less;
   Al: 4% or less;
   Ti: 0.9% to 4%;
   Nb: 6% or less,
      provided that Al+Ti+Nb is 1.0% or more; and
   inevitable impurities including at least C and N,
   with a balance being Ni,
   wherein C is contained in an amount of 0.01% or less, and
   wherein the component composition is produced by removing a coating from a surface of a waste before melting the waste, such that, in the component composition, N, fixed as carbonitride, is contained in such an amount that a Michelin point determined from inclusions extracted by an evaluation method according to ASTM-E45 is 100 or less.

5. The precipitation hardened Ni heat-resistant alloy according to claim 4, wherein an amount of N is 0.0050% or less in terms of mass %.

6. The precipitation hardened Ni heat-resistant alloy according to claim 4, wherein, in the component composition, the Michelin point is in a first-order proportion to (C+4.51N) represented by amounts of C and N.

7. A precipitation hardened Ni heat-resistant alloy having a component composition consisting essentially of, in terms of mass %:
   Cr: 14% to 25%;
   Mo: 15% or less;
   Co: 0.8% or less;
   Cu: 5% or less;
   Al: 4% or less;
   Ti: 0.9% to 4%;
   Nb: 6% or less,
      provided that Al+Ti+Nb is 1.0% or more; and
   inevitable impurities including at least C and N,
   with a balance being Ni,
   wherein C is contained in an amount of 0.01% or less, and
   wherein N, fixed as carbonitride, is contained in such an amount that a Michelin point determined from inclusions extracted by an evaluation method according to ASTM-E45 is 100 or less.

8. The precipitation hardened Ni heat-resistant alloy according to claim 7, wherein an amount of N is 0.0050% or less in terms of mass %.

9. A precipitation hardened Ni heat-resistant alloy having a component composition comprising, in terms of mass %:
Cr: 14% to 25%;
Mo: 15% or less;
Co: 0.8% or less;
Cu: 5% or less;
Al: 4% or less;
Ti: 0.9% to 4%;
Nb: 6% or less,
  provided that Al+Ti+Nb is 1.0% or more; and
inevitable impurities including at least C and N,
with a balance being Ni,
wherein C is contained in an amount of 0.01% or less, and
wherein N, fixed as carbonitride, is contained in such an amount that a Michelin point determined from inclusions extracted by an evaluation method according to ASTM-E45 is 100 or less.

10. The precipitation hardened Ni heat-resistant alloy according to claim 9, wherein the component composition further comprises, in terms of mass %, Fe: 15% to 30%.

11. The precipitation hardened Ni heat-resistant alloy according to claim 9, wherein the component composition further comprises, in terms of mass %, P: 0.005% to 0.010%.

12. The precipitation hardened Ni heat-resistant alloy according to claim 9, wherein an amount of N is 0.0050% or less in terms of mass %.

\* \* \* \* \*